United States Patent

[11] 3,576,106

[72] Inventor Harry J. Nowicki
 Warren, Mich.
[21] Appl. No. 775,851
[22] Filed Nov. 14, 1968
[45] Patented Apr. 27, 1971
[73] Assignee Sperry Rand Corporation
 Troy, Mich.

[54] POWER TRANSMISSION
 6 Claims, 1 Drawing Fig.
[52] U.S. Cl. .................................................. 60/52,
 60/97, 74/661
[51] Int. Cl. ............................................F15b 15/18,
 F15b 18/00, F01b 21/00
[50] Field of Search.......................................... 60/97 (E),
 52 (VSP), 53 (W & R); 91/412; 103/11 (A);
 74/661

[56] References Cited
UNITED STATES PATENTS

| | | | |
|---|---|---|---|
| 1,900,050 | 3/1933 | Ernst............................ | 60/97EUX |
| 2,400,685 | 5/1946 | Collins ......................... | 60/97E |
| 2,580,946 | 1/1952 | Orshansky et al. ........... | 60/97EUX |
| 3,443,379 | 5/1969 | Weisenbach.................. | 60/97EUX |

Primary Examiner—Edgar W. Geoghegan
Attorney—Van Meter and George

ABSTRACT: A plurality of pressure energy-translating devices each of which is comprised of a variable hydraulic pump driving a hydraulic motor, the outputs of which are connected to a common workload to be driven by the same; and, means for controlling the pressure output of the pumps whereby the driving motors each assume half of the common workload.

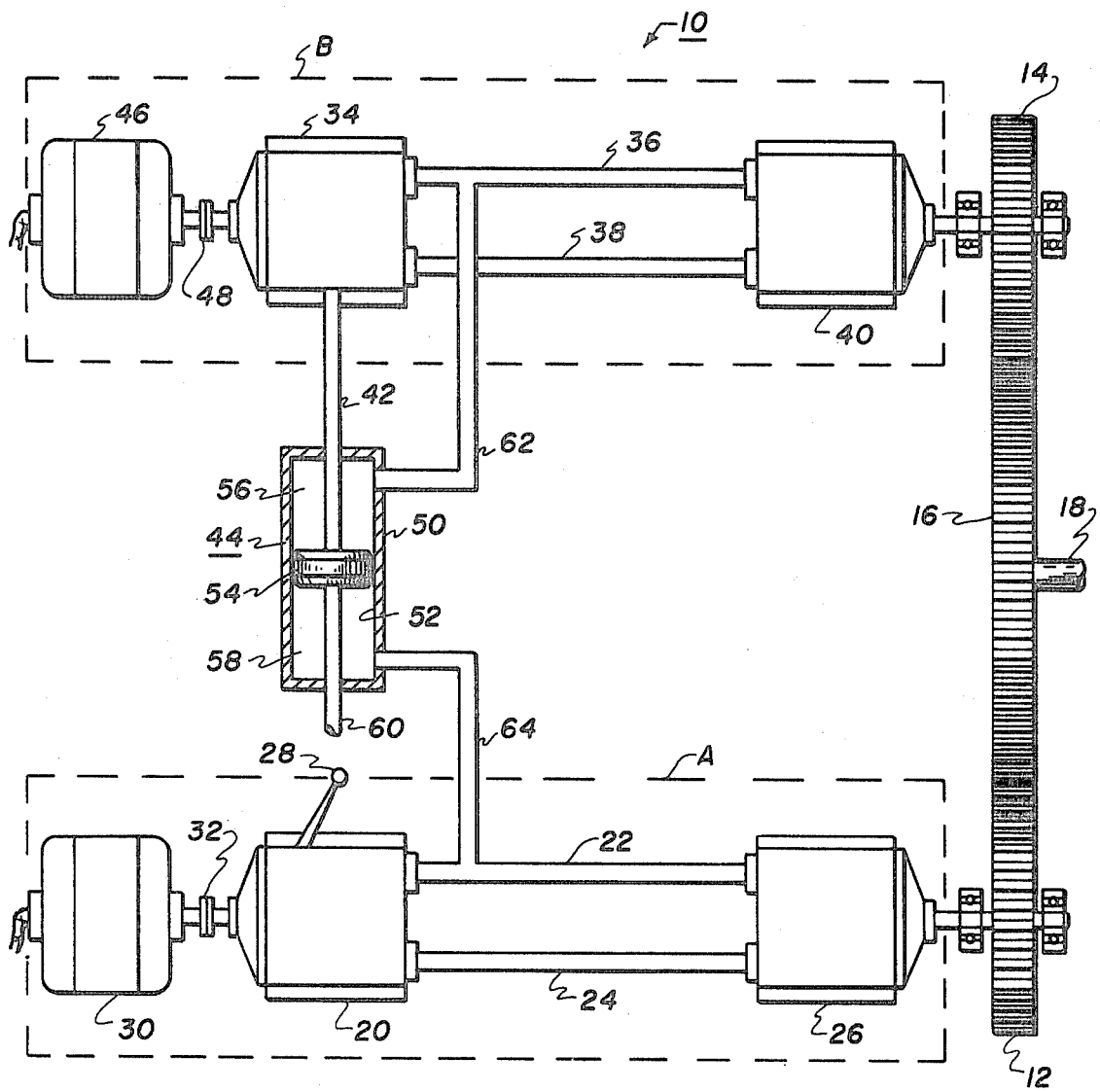

POWER TRANSMISSION

BACKGROUND OF THE INVENTION

This invention relates to power transmissions and is particularly applicable to those of the type comprising two or more fluid pressure energy-translating devices, one of which may function as a pump, and the other as a fluid motor. More particularly, this invention relates to an improvement in a system employing a plurality of power transmissions in which the mechanical output of each transmission is connected to a common workload.

Generally, when a single load is to be driven, only one pump/motor combination of suitable size is required; however, there are certain applications in which the distribution of the weight of such a system for the purpose of balance necessitates the use of a plurality of pump/motor combinations whose total output would equal that of the single combination, but which achieves the desired distribution of weight.

Such a system would comprise, for example, a pair of pump/motor combinations in which the pumps are of the variable displacement type while the motors are of the fixed displacement type. The mechanical outputs of the motors are connected to a common workload and theoretically each motor should assume half the load requirements. However, it has been found that one of the driving motors assumes substantially all of the load while the other motor acts as a follower. Such a condition is both inefficient and uneconomical, which results in a reduction in the life of the unit assuming the greater portion of the workload.

It would thus be very desirable to synchronize the outputs of the two motors used in the one driving operation so as to assure that each motor assumes approximately one-half the workload.

SUMMARY OF THE INVENTION

This invention comprises two pressure energy-translating devices, each having a variable displacement fluid pump driving a fluid motor, the outputs of which are driving a common workload; an actuator means which senses the operation pressures of both devices; and, means which vary the output pressure of one of said variable pumps in response to said sensing means for maintaining the operating pressures of both devices at an approximately equal value.

It is therefore an object of this invention to provide a power transmission system employing a plurality of fluid pumps and motors in which the mechanical outputs are connected to a common load and in which each of said motors shares an equal portion of the workload.

It is also an object of this invention to provide such a system which is of low cost, efficient, and which has a long life.

Further objects and advantages of the present invention will become apparent from the following description, reference being made therein to the accompanying drawing wherein a preferred form of the present invention is clearly shown.

IN THE DRAWING

The single FIGS. is a diagrammatic illustration of a fluid pressure energy transmission system incorporating a preferred form of the present invention.

DESCRIPTION OF THE PREFERRED EMBODIMENT

Referring now to the drawing, there is shown a presently preferred, but merely illustrative embodiment of the inventive principles: a power transmission circuit indicated by the numeral 10. It will be understood that the hydraulic circuit described herein and forming a part of the present invention may be connected to a hydraulic pump or motor or hydraulic operating unit of any type or design, as the present invention has to do with the circulating system rather than the means to be operated.

The driving system is shown in the single figure as consisting of a leading or master section A and a follower section B to drive, respectively, gears 12 and 14 which are connected to a common workload, not shown, by means of gear 16 and shaft 18.

The master section A comprises a variable displacement pump 20 connected in a closed circuit by conduits 22 and 24 to a fluid motor 26. The pump 20 may be of any of the well-known types of variable displacement units and, in the present embodiment, it is illustrated as being manually operable by means of a handle 28. The motor 26 may also be of any of the well-known types of hydraulic motors as is driven in the conventional manner by means of high-pressure fluid admitted from pump 20 through the conduit 22. Fluid is returned to the pump from the motor by means of conduit 24.

Any suitable prime mover, such as an electric motor as illustrated at 30, is mechanically connected through suitable means to an input shaft 32 of the pump for driving the same.

The follower section B is substantially the same as the master section A and comprises a variable displacement pump 34 connected in a closed circuit by conduits 36 and 38 to a fluid motor 40. The pump may also be of any of the well-known types of variable displacement units and in the present embodiment, it is varied by means of stroking arm 42 which extends from a pressure synchronizing linear actuator 44. Pressure fluid is supplied to and from motor 40 by means of pump 34 in a manner similar to the motor 26 within the master section A; that is, high-pressure fluid is supplied to the motor by means of conduit 36 and is returned to the pump by means of conduit 38.

In the present embodiment, if the stroking arm 42 is shifted upwardly, as viewed in the FIG., the displacement of pump 34 will be increased and thus, the amount of fluid pressure being directed to the motor 40 will also increase. In a similar manner, if the stroking arm 42 is shifted downwardly, as viewed in the FIG., the displacement of pump 34 and the fluid pressure being directed to the motor 40 will decrease.

A suitable prime mover such as an electric motor is also provided in the follower section B at 46 and is mechanically connected through a suitable means to an input shaft 48 of the pump 34 for driving the same.

The pressure synchronizing actuator 44 is of the double-acting, nondifferential type and comprises a housing 50 having a bore 52 therein in which is reciprocally mounted a piston 54 forming pressure chambers 56 and 58 on opposite sides thereof. The piston 54 is connected to the stroking arm 42 of pump 34 for driving the same and is connected to a second piston arm 60 on the opposite face thereof and extends from the piston to a point which is external of the housing 50. This is provided for the purpose of having the opposite faces of piston 54, which are exposed to the pressure chambers 56 and 58, of an equal area. It can thus be seen that the piston 54 and thus the stroking arm 42 can be actuated only if a differential in pressures exists across the opposing pressure chambers 56 and 58.

The pressure chambers 56 and 58 are respectively directly connected to the pump high-pressure conduits 36 and 22 by means of conduits 62 and 64 for the purpose of supplying respectively the output pressures of pumps 34 and 20 to the same.

In operation, both electric motors are actuated to supply the motive power necessary to drive the pumps, which in turn supply pressure fluid to their associated motors. The motors being coupled to a common workload will both be operated at the same speed. At the same time, pressure fluid from both of the pumps' high-pressure conduits 36 and 22 is respectively supplied directly to the pressure chambers 56 and 58 of actuator 44 and respectively act against the opposite faces of piston 54. In the event the pressure in the follower section B drops, such that the master section A is supplying substantially all the motive power to drive the common workload, there will be differential across piston 54. That is, the pressure in chamber 58 will be higher than that in chamber 56 with a net effect that piston 54 will be shifted upwardly stroking the pump 34 to a greater displacement. This will cause the pressure in the pump outlet conduit 36 to increase until it equals the pressure in the master section A conduit 22 which had been decreasing as motor 40 assumed an increasing portion of the load. When the pressures in both conduits 22 and 36 are equal, the actuator 44 will reach a stabilized position with the net effect that both motors are now sharing approximately half of the common workload.

It can thus be seen that the present invention has provided a power transmission system employing a plurality of fluid pumps and motors in which the mechanical output of the motors drives a common workload while sharing an equal portion of that load; and one which is of low cost, efficient, simple in operation, and of a long life.

While the form of embodiment of the present invention as herein disclosed constitutes a preferred form, it is to be understood that other forms might be adopted, all coming within the scope of the claims which follow.

I claim:

1. A pressure energy-translating system for driving a machine comprising:
   a plurality of power transmissions, each having a variable displacement fluid pump driving a fluid motor said motor generating a mechanical output in response to the operating pressure of said pump;
   means connecting said mechanical outputs to said machine for simultaneous driving of the same;
   actuator means directly actuated by the difference between the operating pressures of said fluid pumps for controlling the displacement of one of said pumps to increase or decrease the operating pressure of said one pump to a value equal to the operating pressure of the other of said pumps, whereby the mechanical output of each motor is of the same magnitude.

2. A pressure energy translating system as described in claim 1 wherein said one pump is connected to one of said fluid motors in a closed circuit including a first high-pressure conduit so that the pump delivers high-pressure fluid to drive the said one fluid motor; wherein said other pump is connected to the other of said fluid motors in a closed circuit including a second high-pressure conduit so that said other pump delivers high-pressure fluid to drive said other fluid motor; wherein said actuator means comprises an enclosed housing having a bore with a pressure-responsive piston reciprocally mounted therein forming a pair of pressure chambers on opposite sides thereof, one of which is directly connected to said first high-pressure conduit, the other directly connected to said second high-pressure conduit; and means for varying the displacement of said one pump in response to the position of said piston.

3. A pressure energy-translating system as described in claim 2 wherein said displacement varying means is connected to one side of said piston.

4. A pressure energy-translating system as described in claim 3 wherein said opposite sides of said piston have pressure-responsive areas, exposed to their corresponding pressure chambers, which are of an equal magnitude whereby an increase in said second high-pressure conduit will create a pressure differential across said piston to shift the position of the same for varying the displacement of said one pump.

5. A pressure energy translating system as described in claim 4 wherein said increase in said second high-pressure conduit results in an increase of the displacement of said one pump.

6. A pressure energy-translating system as described in claim 5 wherein the displacement of said other pump is manually operated.